US012065875B2

(12) United States Patent
Chuang

(10) Patent No.: US 12,065,875 B2
(45) Date of Patent: Aug. 20, 2024

(54) HANGING BLINDS

(71) Applicants: ABO WINDOW FASHION CORP, Chino, CA (US); Shan-Chi Chuang, New Taipei (TW)

(72) Inventor: Shan-Chi Chuang, New Taipei (TW)

(73) Assignees: ABO WINDOW FASHION CORP.; Shen-Chi Chuang, New Taipei (TW)

(*) Notice: Subject to any disclaimer, the term of this patent is extended or adjusted under 35 U.S.C. 154(b) by 0 days.

(21) Appl. No.: 17/676,789

(22) Filed: Feb. 21, 2022

(65) Prior Publication Data

US 2022/0275682 A1 Sep. 1, 2022

(30) Foreign Application Priority Data

Feb. 26, 2021 (TW) ................................ 110202153

(51) Int. Cl.
*E06B 9/36* (2006.01)

(52) U.S. Cl.
CPC .................................... *E06B 9/362* (2013.01)

(58) Field of Classification Search
CPC . E06B 9/362; E06B 9/36; E06B 9/364; E06B 9/365; E06B 9/368; A47H 5/032; A47H 15/02; A47H 2023/025; A47H 23/05; A47H 1/06; A47H 2001/047
See application file for complete search history.

(56) References Cited

U.S. PATENT DOCUMENTS

| | | | | |
|---|---|---|---|---|
| 3,975,862 A * | 8/1976 | Doan | E05D 15/08 | 16/96 R |
| 5,109,910 A * | 5/1992 | Tortorella | E06B 9/362 | 160/202 |
| 6,892,783 B1 * | 5/2005 | Comeau | A47H 23/01 | 160/98 |
| 7,174,944 B1 * | 2/2007 | Clark | E05D 15/08 | 49/424 |
| 7,762,305 B2 * | 7/2010 | Huang | A47H 23/04 | 160/202 |
| 8,297,334 B2 * | 10/2012 | Chu | E06B 9/36 | 160/202 |
| 10,544,620 B2 * | 1/2020 | Colson | E06B 9/36 | |
| 11,060,346 B2 * | 7/2021 | Chuang | A47H 5/032 | |
| 2007/0261799 A1 * | 11/2007 | Chu | E06B 9/36 | 160/197 |

(Continued)

FOREIGN PATENT DOCUMENTS

| | | | | |
|---|---|---|---|---|
| EP | 1908916 A1 * | 4/2008 | E06B 9/36 | |
| GB | 2381438 A * | 5/2003 | A47H 1/06 | |

*Primary Examiner* — Abe Massad

(57) ABSTRACT

Hanging blinds includes an upper track and a plurality of sliders. The upper track has at least a first track and a second track respectively having a sliding slot. Each of sliders has a guiding groove and a positioning groove. A sliding block is disposed at an end of the positioning groove and enabling the slider to be mounted onto a guiding groove of an adjacent slider. Each slider is mounted onto one sliding slot of the first and second tracks. A last slider on the second track has at least two positioning blocks locking with an end of the second track. The sliders other than the last slider each has a pulley. The last slider on the first track has a crossing pulley slidably mounted in the sliding slot of the second track. The crossing pulley is disposed before a pulley of a first slider on the second track.

4 Claims, 12 Drawing Sheets

(56) References Cited

U.S. PATENT DOCUMENTS

| | | | | |
|---|---|---|---|---|
| 2011/0226716 | A1* | 9/2011 | Chen | A47H 23/08 211/105.1 |
| 2019/0218857 | A1* | 7/2019 | Chuang | A47H 23/02 |
| 2020/0256123 | A1* | 8/2020 | Chuang | A47H 15/02 |
| 2021/0017808 | A1* | 1/2021 | Chuang | A47H 1/08 |

* cited by examiner

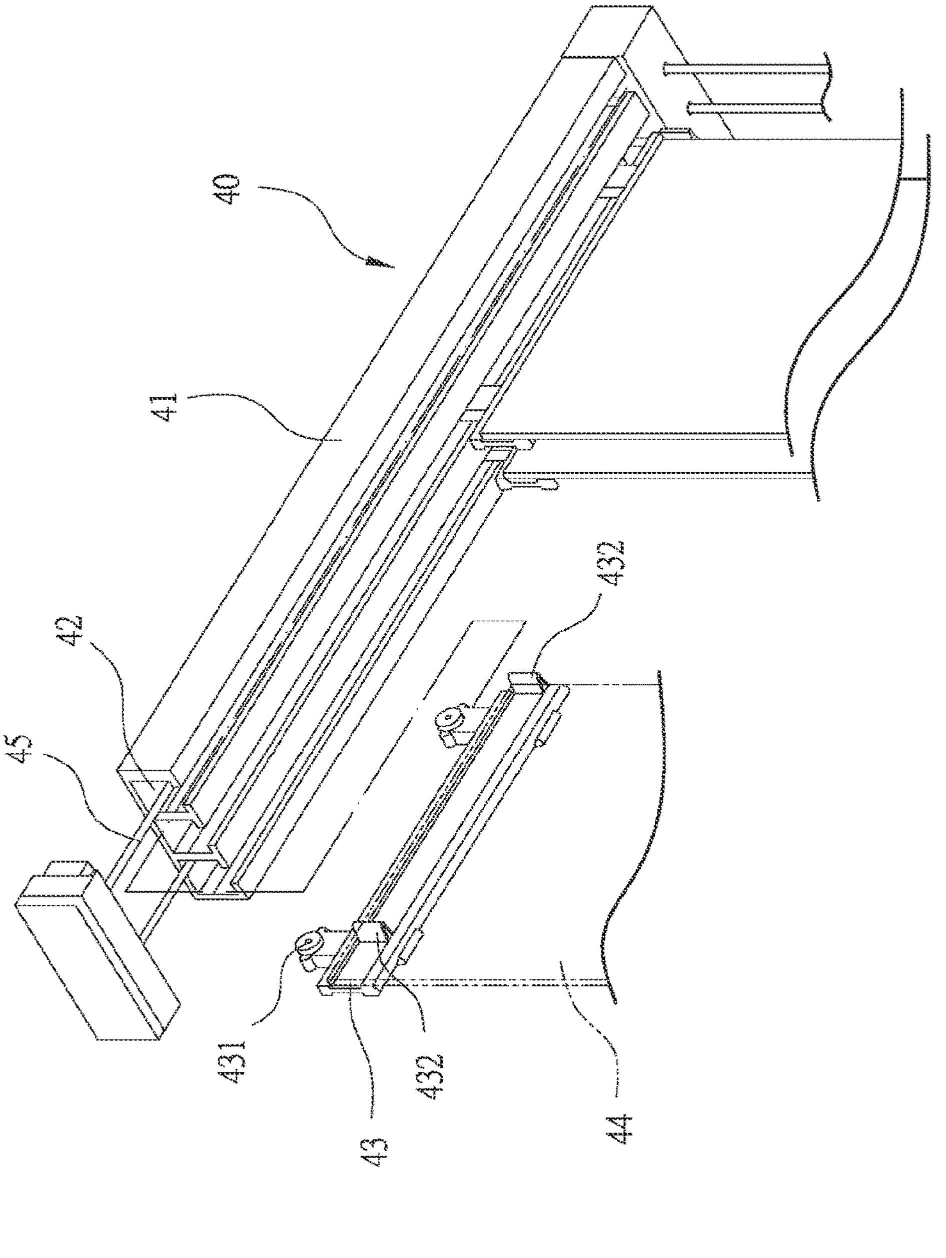
FIG. 12, Prior Art

HANGING BLINDS

BACKGROUND OF INVENTION

Field of Invention

The present invention relates to a shielding structure, and more particularly to hanging blinds.

Description of the Related Art

Usually, windows are equipped with curtains to maintain or change the lighting and shading of the windows. When the outside lighting is too strong or privacy is required, the curtains can be for change. There are many different structures and styles of curtains, such as hanging curtains, roller shutters, blinds or roman curtains, etc. But the basic purpose of curtains is nothing more than to be able to block light and to ensure privacy, it is also necessary to be able to control the appropriate light to enter the room.

For conventional vertical curtains structure, as shown in FIG. 12, the curtain structure 40 includes a support base 41; a plurality of slide rails 42 arranged side by side on the support base 41; a plurality of rail rods 43 are respectively arranged on each slide rail 42, the upper ends of these rail rods 43 are all respectively provided with two pulleys 431 mounted in the slide rails 42; a plurality of curtains 44 connected to the rail rods 43; and a pull cord 45 disposed on the support base 41 and capable of driving the rail rods 43. Furthermore, the rail rods 43 are respectively provided with a plurality of positioning blocks 432 staggered to limit the movement between the sliding bases 13.

According to the above-mentioned conventional structure, it is not difficult to find that there are still some deficiencies. The main reasons are as follows: the plurality of rail rods 43 of the conventional curtain structure 40 are respectively set on the sliding rail 42 of the support base 41 through the pulley 431, such that the number of the slide rails 42 of the support base 41 must be increased in sequence according to the number of the slide bars 43, thereby increasing the size and volume of the support base 41, which resulting in an increase in the manufacturing cost, the packaging and the assembly difficulty of installation of volume of the support base 41.

Therefore, it is desirable to provide hanging blinds to mitigate and/or obviate the aforementioned problems.

SUMMARY OF THE INVENTION

An objective of present invention is to provide a hanging blinds, which is capable of improving the above-mention problems.

In order to achieve the above mentioned objective.

Other objects, advantages, and novel features of invention will become more apparent from the following detailed description when taken in conjunction with the accompanying drawings.

BRIEF DESCRIPTION OF DRAWINGS

FIG. 12 is a cross-sectional view of the sliding-push-back linkage of a prior art.

DETAILED DESCRIPTION OF THE PREFERRED EMBODIMENT

Figure 1:
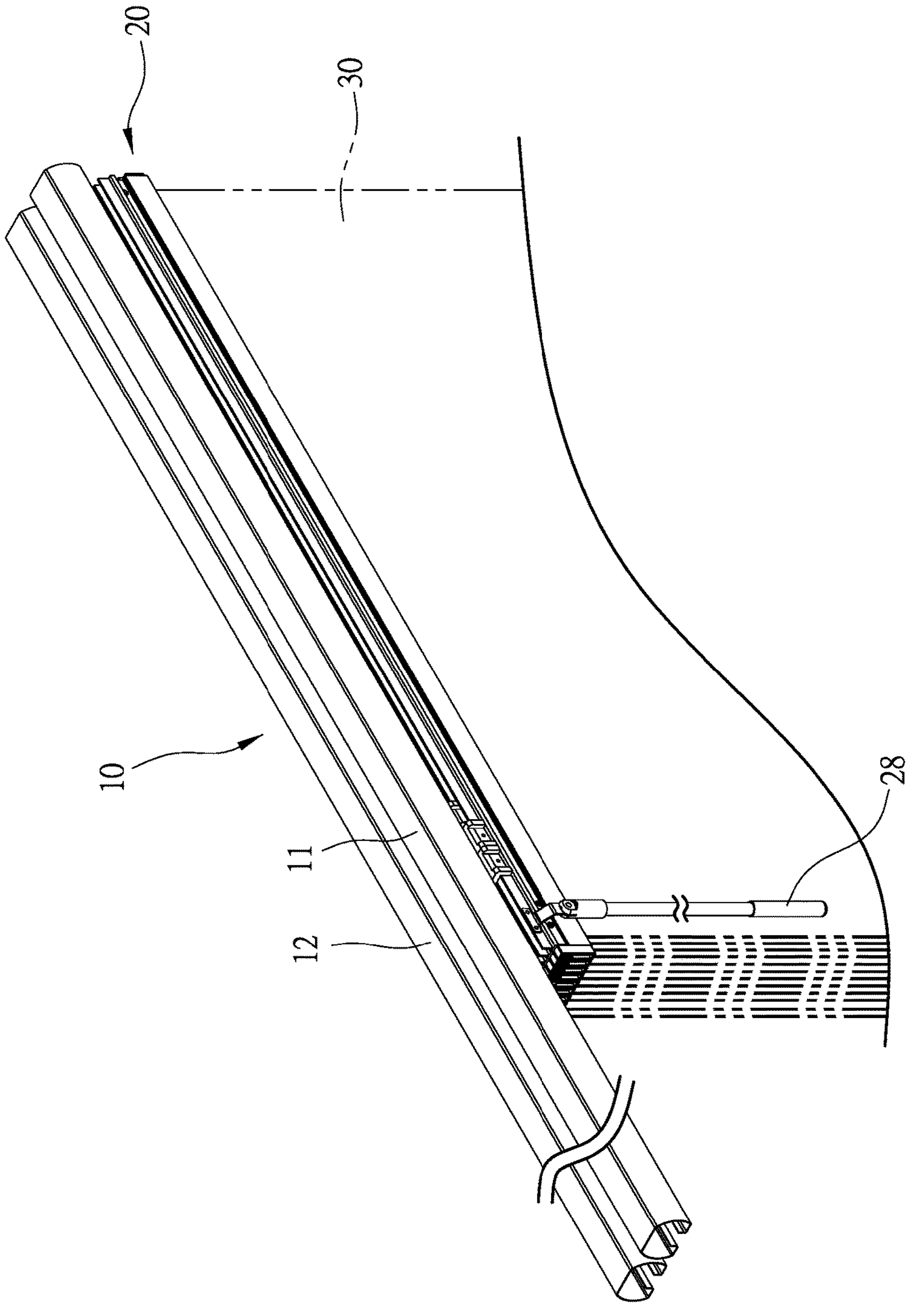
FIG. 1 is a three-dimensional view of a preferred embodiment according to the present invention.
Figure 2:
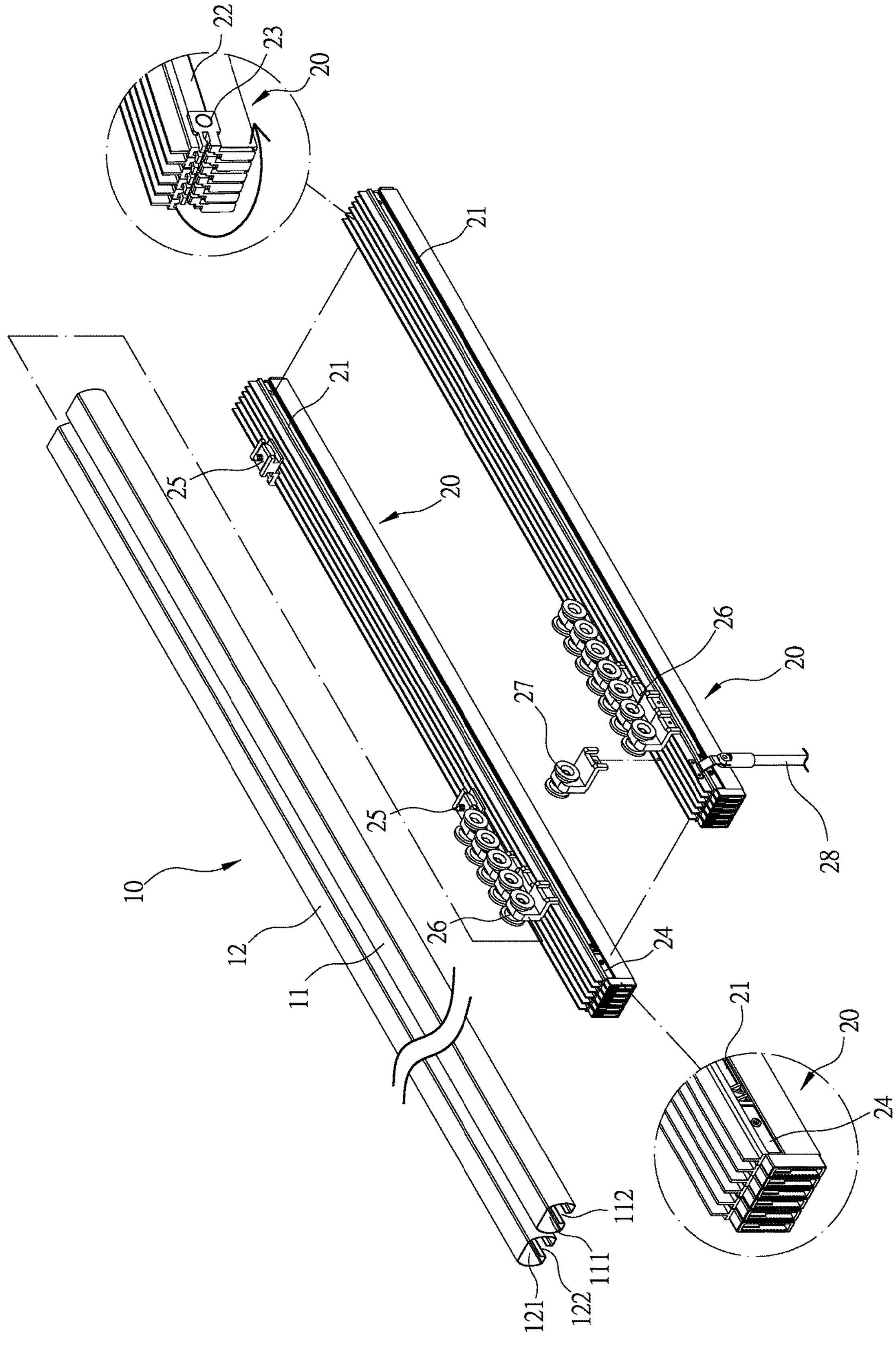
FIG. 2 is an exploded view of the preferred embodiment according to the present invention.
Figure 3:
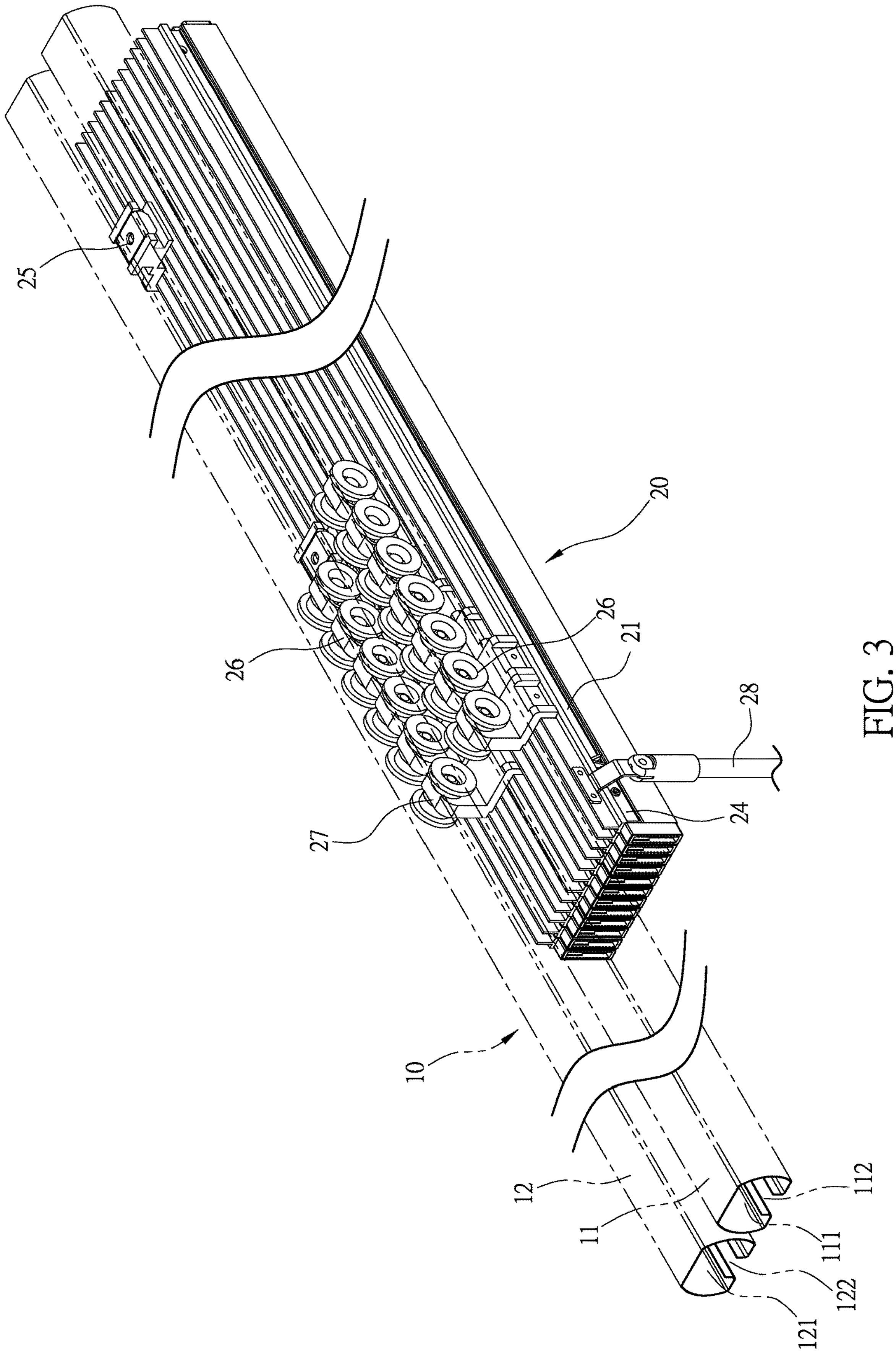
FIG. 3 is a three-dimensional schematic drawing of the composition of the preferred embodiment according to the present invention.
Figure 4:
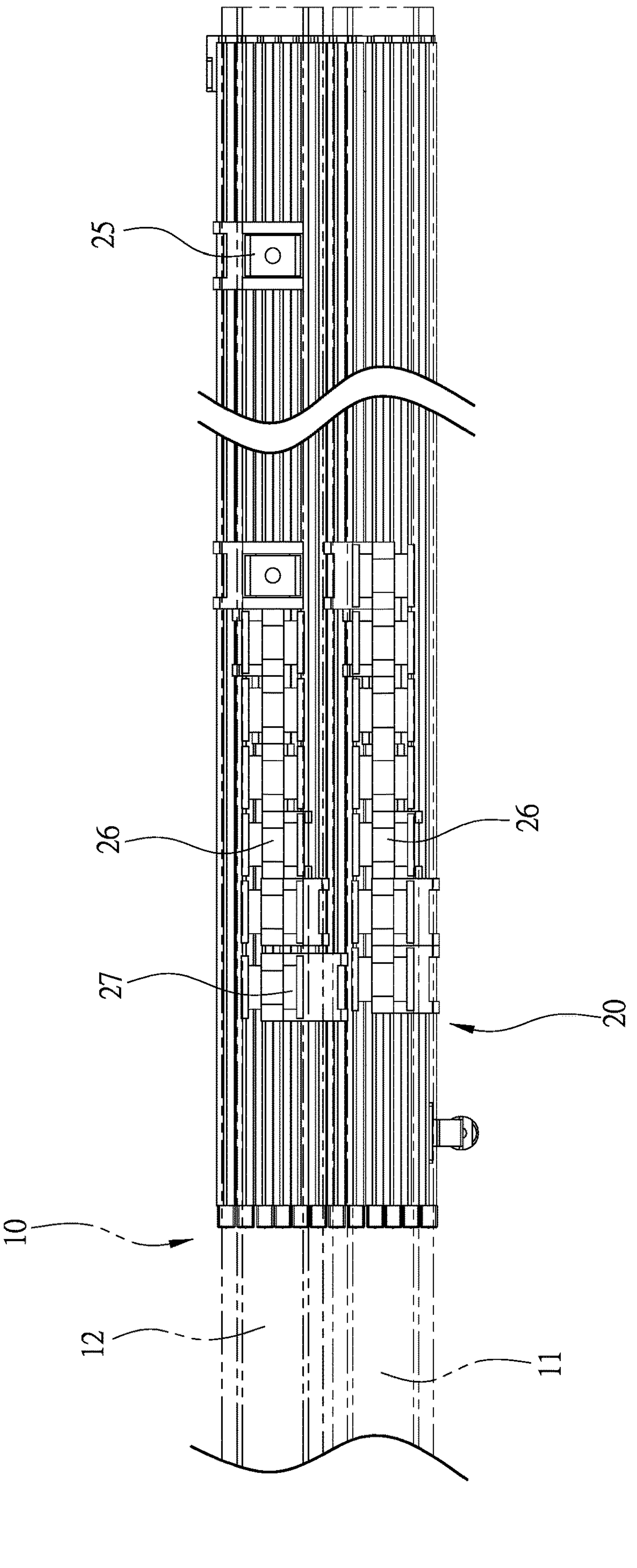
FIG. 4 is a schematic top view of the composition of the preferred embodiment according to the present invention.
Figure 5:
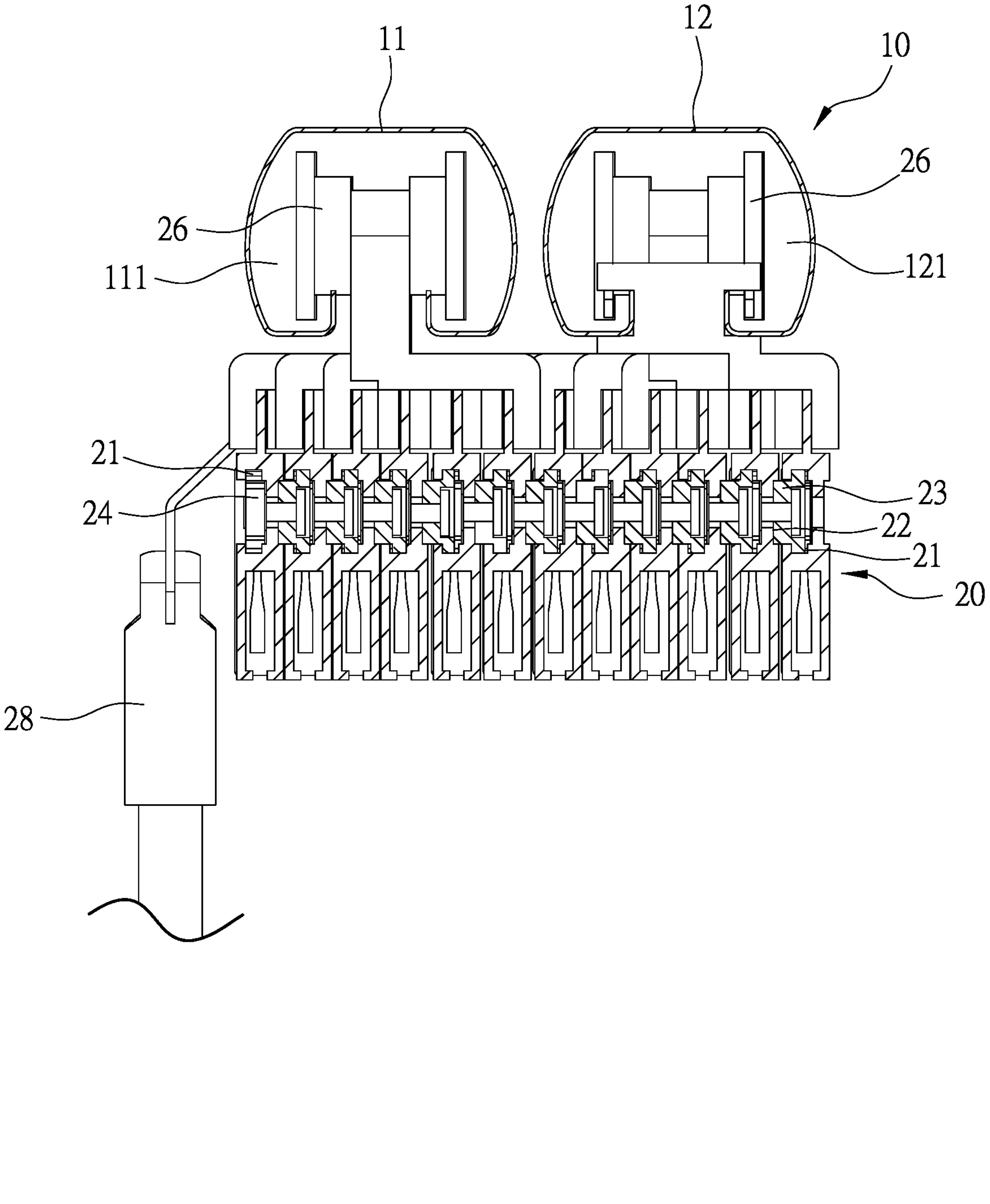
FIG. 5 is the combined cross-sectional view of the preferred embodiment according to the present invention.
Figure 6:
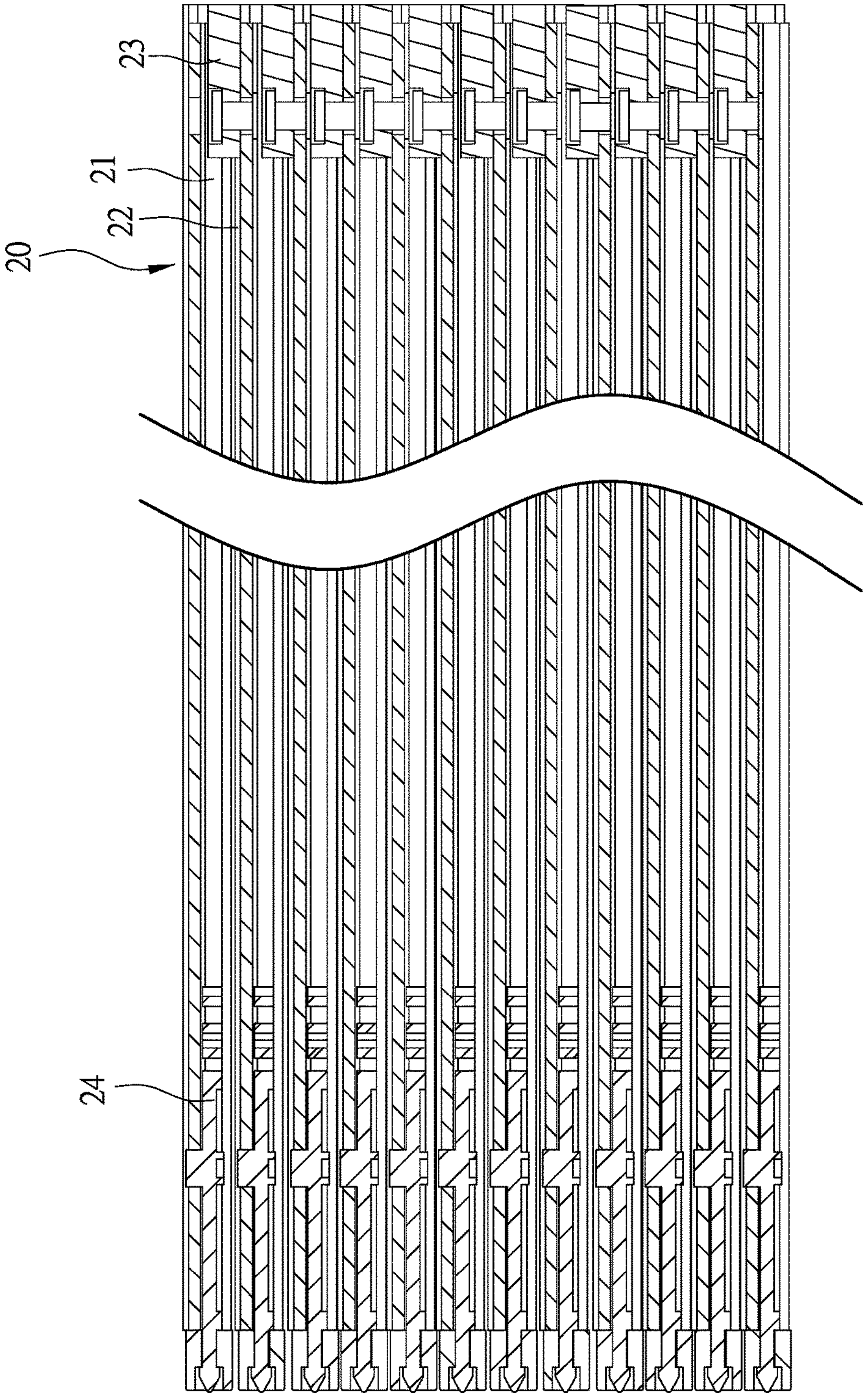
FIG. 6 is a combined cross-sectional view from another perspective of the preferred embodiment according to the present invention.
Figure 7:
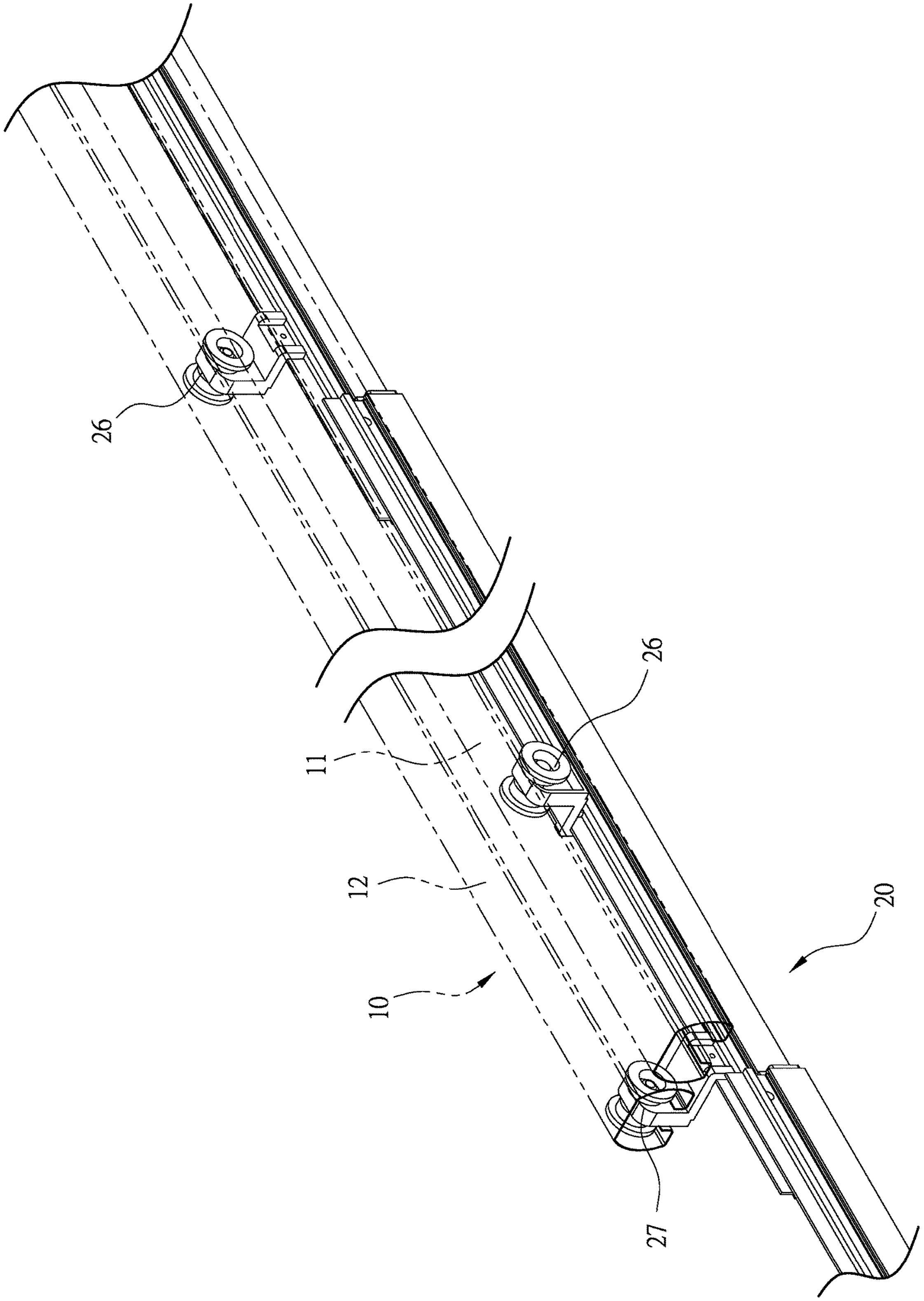
FIG. 7 is a three-dimensional view showing the slider being pulled out according to the present invention.
Figure 8:
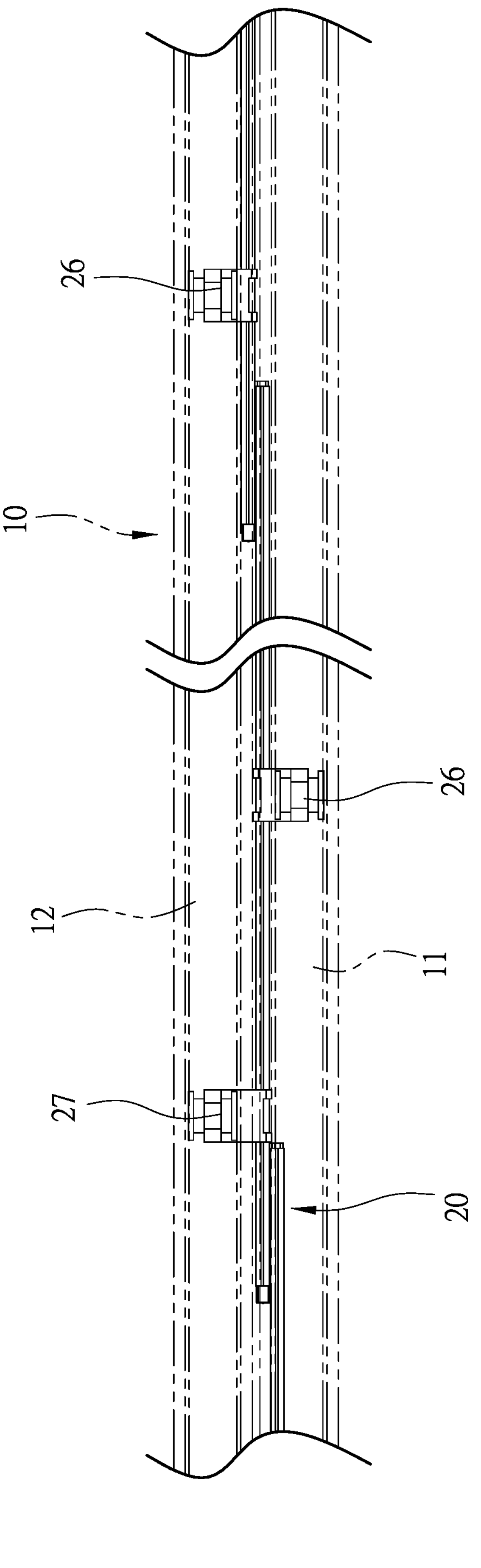
FIG. 8 is the top view of the slider pull-out linkage according to the present invention.
Figure 9:
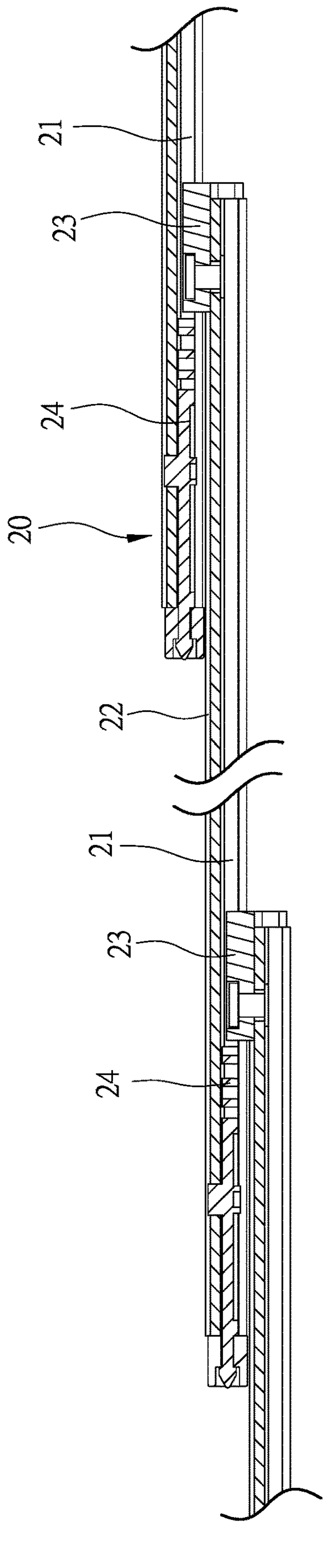
FIG. 9 is a cross-sectional view of the slider being pulled out according to the present invention.

First, please refer to FIG. 1 to FIG. 6. Hanging blinds comprises an upper track 10 and a plurality of sliders 20. The upper track 10 has a first track 11 and a second track 12, and the first and second tracks 11, 12 both respectively comprising a sliding slot 111, 121 and an opening 112, 122 connected to the sliding slot 111, 121. The first and second tracks 11, 12 are parallel with each other. Each slider 20 has a guiding groove 21 and a positioning groove 22. A sliding block 23 is disposed at an end of the positioning groove 22 and enabling the slider 20 to be slidably mounted onto a guiding groove 21 of an adjacent slider 20. A stopping block 24 is mounted on a front end of the guiding groove 21. Each slider 20 being mounted onto a respective one of the sliding slots 111, 121 of the first and second tracks 11, 12. A last slider 20 on the second track 12 has at least two positioning blocks 25 at a top thereof locking with an end of the second track 12, and the sliders 20 other than the last slider 20 each has a pulley 26 slidably mounted in the sliding slots 111, 121 of the first or second tracks 11, 12. The last slider 20 on the first track 11 further has a crossing pulley 27 mounted in the sliding slot 121 of the second track 12, and the crossing pulley 27 is disposed before a pulley 26 of a first slider 20 on the second track 12.

Furthermore, the first and second tracks 11, 12 of the upper track 10 are respectively assembled in telescope manner, which provides an adjustable length.

Moreover, each slider 20 is connected to a curtain 30.

In addition, each slider 20 on the first track 12 has two pulleys 26.

Also, the first slider 20 on the first track 11 is provided with a pulling rod 28.

The actual operation of the above mentioned structure, please refer to FIGS. 3, 7, 8, and 9. The sliders 20 are mounted both on the first and second tracks 11, 12 of the upper track 10 and the upper track 10 is installed above a desired window. The bottom of each slider 20 is attached with a curtain 30 to cover the window. When a user wants to unfold the curtain 30, he or she pulls the pull rod 28 to slide the first slider 20. When the first slider 20 is pulled out, it not only slides along the sliding slot 111 of the first track 11, but also moves the sliding block 23 along the guiding groove 21 of another adjacent slider 20, so that the sliding block 23 pushes against the stopping block 24 at the front of the guiding groove 21 and then pulls out the other sliders 20.

Also, the last slider 20 on the first track 11 is also slidably installed in the guiding groove 21 of the first slider 20 on the second track 12 via the sliding block 23, so that the sliders 20 on the second track 12 can be pulled out in sequence so the window is covered by the curtains 30.

Figure 10:
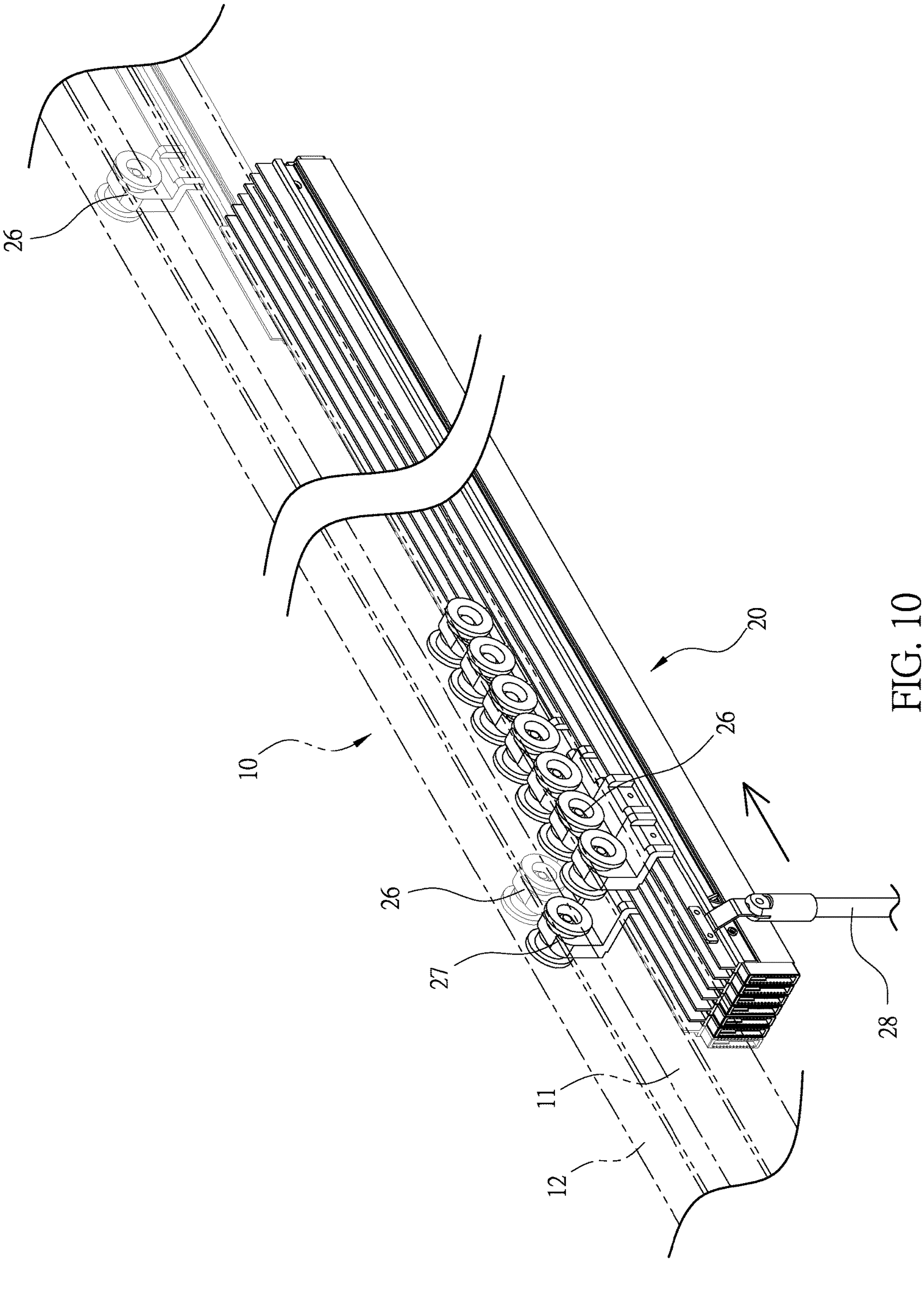
FIG. 10 is a three-dimensional view of the slider pushing back according to the present invention.
Figure 11:
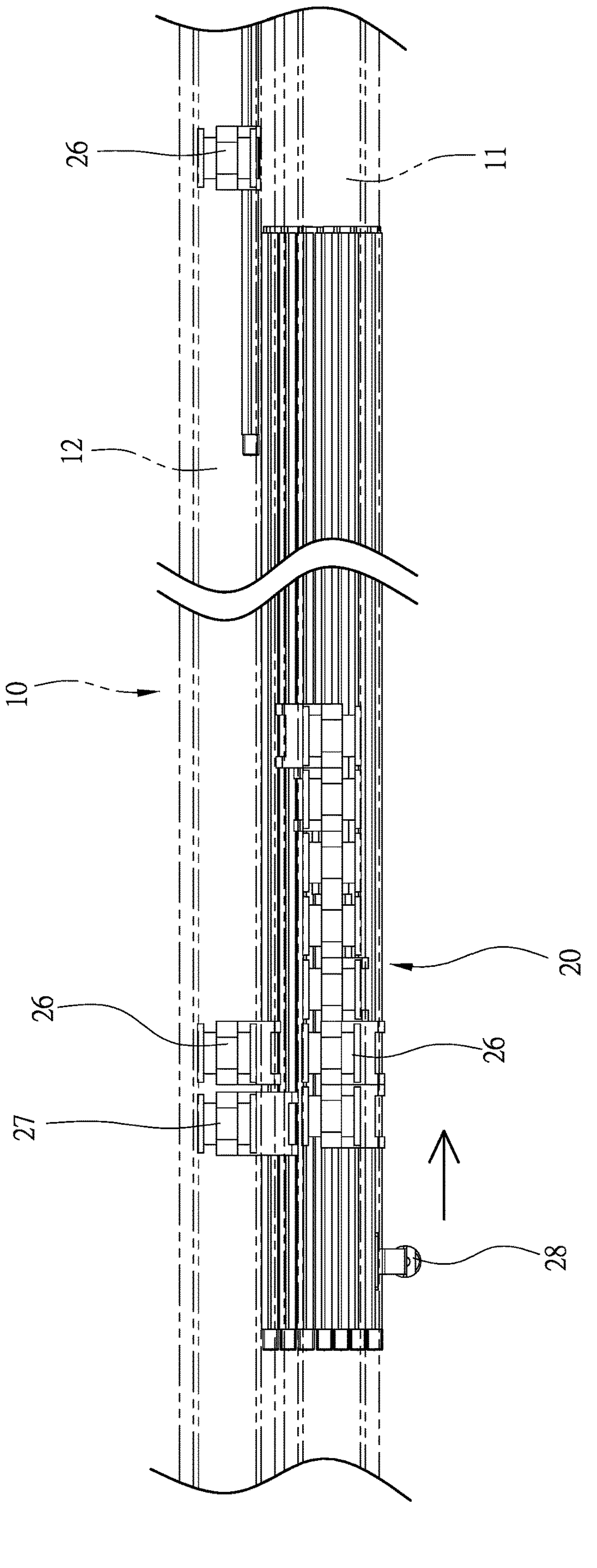
FIG. 11 is the top view of the slider of the preferred embodiment according to the present invention.

Conversely, in order to collect the curtains 30 back together, please refer to FIGS. 7, 10, and 11 again. The user uses the pull rod 28 to push the first slider 20 on the first track 11 backward, the slider 20 is pushed and slides back along the first track 11 via the pulley 26, the pulley 26 pushes back an following pulley 26 to move the adjacent slider 20 and so on until the last slider 20 on the first track 11 is pushed back. Then, the crossing pulley 27 abuts the pulley 26 of the first slider 20 on the second track 12, thereby the sliders 20 on the first and second tracks 11, 12 are pushed back in order, so that all the curtains 30 are pushed back to the ends of the first and second tracks 11, 12 to be gathered together.

With the structure of the above-mentioned specific embodiment, the following benefits can be obtained: the hanging curtain structure of this present invention has a plurality of sliders evenly and respectively mounted into the first and second tracks 11, 12, and the first and second tracks 11 and 12 are set independently and arranged in parallel. The curtain structure can be adjusted by increasing or decreasing the number of slide tracks according to the size of the window. The tracks 11, 12 equally shares the weight of the sliders 20 and the curtains 30, which avoids the deformation of the upper track 10 and thereby improving the travel smoothness of the slider 20.

In addition, the last slider 20 on the first track 11 is provided with the pulley 26 and the crossing pulley 27, so that the last slider 20 is capable of sliding between the first and second tracks 11 and 12 at the same time, which helps to improve the sliding stability of the slider 20. Also, the pulley 26 of the last slider 20 on the second track 12 is pushed by the crossing pulley 27, to make linkage among the sliders 20 between the first and second tracks 11 and 12.

Although the present invention has been explained in relation to its preferred embodiment, it is to be understood that many other possible modifications and variations can be made without departing from the spirit and scope of invention as hereinafter claimed.

What is claimed is:

1. Hanging blinds comprising:

an upper track having at least a first track and a second track both respectively comprising a pair of sliding slots with an opening between the pair of sliding slots, each of the slots being U-shaped, the first and second tracks being parallel with each other;

a plurality of sliders, each slider having:

a guiding groove, a positioning groove, a sliding block disposed at an end of the positioning groove and enabling the slider to be slidably mounted onto a guiding groove of an adjacent slider of the plurality of sliders, and a stopping block mounted on a front end of the guiding groove and configured to stop a sliding block of another adjacent slider of the plurality of sliders;

each slider being mounted onto a respective one of the pair of sliding slots of the first and second tracks;

a last slider mounted on the second track from the plurality of sliders further having at least two positioning blocks at a top thereof locking with an end of the second track;

the plurality of sliders, other than the last slider mounted on the second track and a last slider mounted on the first track, each having only a single pulley slidably mounted in the pair of sliding slots of one of the first or second tracks; and the last slider mounted on the first track from the plurality of sliders further having a crossing pulley slidably mounted in the pair of sliding slots of the second track, and the crossing pulley is disposed before a pulley of a first slider on the second track from the plurality of sliders.

2. The hanging blinds as claimed in claim 1, wherein each slider is connected to a curtain.

3. The hanging blinds as claimed in claim 1, wherein a first slider of the plurality of sliders on the first track has two pulleys.

4. The hanging blinds as claimed in claim 1, wherein a first slider on the first track from the plurality of sliders is provided with a pulling rod.

* * * * *